United States Patent
Wu et al.

(10) Patent No.: US 10,248,053 B2
(45) Date of Patent: *Apr. 2, 2019

(54) TRANSFER ASSIST MEMBERS

(71) Applicant: Xerox Corporation, Norwalk, CT (US)

(72) Inventors: Jin Wu, Pittsford, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/267,816

(22) Filed: Sep. 16, 2016

(65) Prior Publication Data

US 2018/0081302 A1    Mar. 22, 2018

(51) Int. Cl.
| G03G 15/16 | (2006.01) |
| C09D 171/02 | (2006.01) |
| C09D 161/28 | (2006.01) |
| C09D 171/00 | (2006.01) |

(52) U.S. Cl.
CPC ......... *G03G 15/162* (2013.01); *C09D 161/28* (2013.01); *C09D 171/00* (2013.01); *G03G 15/1685* (2013.01); *C09D 171/02* (2013.01)

(58) Field of Classification Search
CPC ..................................................... G03G 15/162
See application file for complete search history.

(56) References Cited

U.S. PATENT DOCUMENTS

| 7,148,309 | B2 | 12/2006 | Malik et al. |
| 8,765,342 | B2* | 7/2014 | Wu ............. G03G 5/0546 430/66 |
| 9,141,037 | B2* | 9/2015 | Wu ............. G03G 15/14 |
| 2011/0211883 | A1* | 9/2011 | Ferrar ............. G03G 15/161 399/350 |
| 2012/0107559 | A1 | 5/2012 | Ferrar et al. |
| 2012/0171494 | A1 | 7/2012 | Ferrar et al. |
| 2014/0127616 | A1* | 5/2014 | Wu ............. G03G 5/0546 430/58.5 |
| 2015/0050055 | A1 | 2/2015 | Wu et al. |

FOREIGN PATENT DOCUMENTS

| EP | 1 726 627 A2 | 11/2006 |
| EP | 1 726 628 A1 | 11/2006 |
| EP | 3 276 426 A1 | 1/2018 |

* cited by examiner

*Primary Examiner* — Ramsey Zacharia
(74) *Attorney, Agent, or Firm* — Hoffman Warnick LLC (57) ABSTRACT

A transfer assist member comprising a plurality of layers, one of the layers being a check film layer comprised of a hydroxyl terminated poly(oxetane) based fluorinated polyether.

21 Claims, 4 Drawing Sheets

TRANSFER ASSIST MEMBERS

This disclosure is generally directed to transfer assist members comprised of a plurality of layers, one of which layers is a check film layer comprising a hydroxyl terminated poly(oxetane) based fluorinated polyether.

BACKGROUND

The process of xerography includes forming a light image of an original document to be copied typically recorded in the form of a latent electrostatic image upon a photosensitive or a photoconductive member, with subsequent rendering of the latent image visible by the application of toner compositions. The resulting visual toner image can be either fixed directly upon the photosensitive member or the photoconductor member, or transferred from this member to a support member, such as a sheet of plain paper, with subsequent affixing by, for example, the application of heat and pressure of the developed image thereto.

To affix or fuse toner material onto a support member like paper, by heat and pressure, it is usually necessary to elevate the temperature of the toner and simultaneously apply pressure sufficient to cause the components of the toner to become tacky and coalesce. In both the xerographic and the electrographic recording arts, the use of thermal energy for fixing toner images onto a support member is known.

One approach to the heat and pressure fusing of toner images onto a support member has been to pass the support member, with the toner images thereon, between a pair of pressure engaged roller members, at least one of which is internally heated. For example, the aforementioned support member containing developed toner images may pass between a fuser roller and a pressure roller. During operation of a fusing system of this type, the support member to which the toner images are electrostatically adhered is moved through the nip formed between the rollers with the toner image contacting the fuser roll to thereby cause heating of the toner images within the nip.

The process of transferring charged toner particles from an image bearing member marking device, such as a photoconductor, to an image support substrate, like a sheet of paper, involves overcoming cohesive forces holding the toner particles to the image bearing member. The interface between the photoconductor surface and image support substrate may not in many instances be optimal, thus, problems may be caused in the transfer process when spaces or gaps exist between the developed image and the image support substrate. One aspect of the transfer process is focused on the application and maintenance of high intensity electrostatic fields in the transfer region for overcoming the cohesive forces acting on the toner particles as they rest on the photoconductive member. Control of these electrostatic fields and other forces is a factor for inducement of the physical detachment and transfer of the charged toner particles without scattering or smearing of the toner particles. Mechanical devices that force the image support substrate into contact with the image bearing surface have also been incorporated into transfer systems.

More specifically, the process of transferring charged toner particles from an image bearing member, such as a photoconductive member, to an image support substrate, such as a copy sheet or sheet of paper, may be accomplished by overcoming adhesive forces holding the toner particles to the image bearing member. In general, the transfer of developed toner images in xerographic processes has been accomplished by electrostatic induction using a corona generating device, wherein the image support substrate is placed in direct contact with the developed toner image on the photoconductive surface while the reverse side of the image support substrate is exposed to a corona discharge. The corona discharge generates ions having a polarity opposite that of the toner particles, thereby electrostatically attracting and transferring the toner particles from the photoconductive member to the image support substrate.

In the electrostatic transfer of the developed toner image to a copy sheet, it is usually necessary for the copy sheet to be in uniform intimate contact with the toner image developed on the photoconductive surface. Unfortunately, the interface between the photoreceptive surface and the copy sheet is not always optimal. Thus, non-flat or uneven image support substrates, such as copy sheets that have been mishandled, left exposed to the environment or previously passed through a fixing operation, such as heat and/or pressure fusing, tend to promulgate imperfect and partial contact with the photoreceptive surface of the photoconductor. Further, in the event the copy sheet is wrinkled, the sheet will not be in intimate contact with the photoconductive surface and spaces, or air gaps will materialize between the developed image on the photoconductive surface and the copy sheet. Problems may occur in the transfer process when spaces or gaps exist between the developed image and the copy substrate, and where there is a tendency for toner not to transfer across these gaps causing variable transfer efficiency, and which can create areas of low or no transfer resulting in a phenomenon known as image transfer deletion. Image deletion is very undesirable in that useful information and indicia are not reproduced on the copy sheet.

Image transfer deletion is undesirable in that portions of the desired image may not be appropriately reproduced on the print sheet. The area of the transfer assist blade that contacts the photoreceptor will, in most instances, pick up residual dirt and toner from the photoreceptor surface. In the next sequence, print sheets, such as those used with xerographic systems, will cause the residual dirt on the transfer assist blade to be transferred to the back side of the print sheet resulting in unacceptable print quality defects. Additionally, continuous frictional contact between the blade and the photoreceptor, also referred to in many instances as a photoconductor, may cause permanent damage to the photoreceptor.

In single pass color machines, it is desirable to cause as little disturbance to the photoreceptor as possible so that motion errors are not propagated along the belt to cause image quality and color separation registration problems. One area that has potential to cause such a disturbance is when a sheet is released from the guide after having been brought into contact with the photoreceptor for transfer of the developed image thereto. This disturbance, which is often referred to as trail edge flip, can cause image defects on the sheet due to the motion of the sheet during transfer caused by energy released due to the bending forces of the sheet. Particularly in machines which handle a large range of paper weights and sizes, it is difficult to include a sheet guide which can properly position any weight and size sheet while not causing the sheet to oscillate after having come in contact with the photoreceptor.

For multicolor xerography, it is desirable to use an architecture which comprises a plurality of image forming stations and a transfer assist member that can cause image deletions. One example of the plural image forming station architecture utilizes an image-on-image (IOI) system in which the photoreceptive member is recharged, reimaged and developed for each color separation.

There is a need for transfer assist members that substantially avoid or minimize the disadvantages illustrated herein.

There is also a need for toner developed images transfer assist members that permit the continuous contact between a photoconductor and the substrate to which the developed toner image is to be transferred, and processes for enhancing contact between a copy sheet and a developed image positioned on a photoconductive member.

Further, there is a need for transfer assist members (TAM), such as a transfer assist blade (TAB), comprising a low surface energy check film with excellent rub resistance for extended time periods, and where the TAM further includes a wear resistant top layer.

Another need resides in the provision of check films with improved rub resistance compared, for example, to known thermoplastic polyester check films.

Also, there is need for transfer assist members comprising fluoro containing polymers that are environmentally acceptable, and that are free of, or possess minimal bioaccumulation characteristics.

Further, there is a need for environmentally acceptable fluoropolymer based check films for inclusion into transfer assist members, and which fluoro polymer is free of, or substantially free of bioaccumulation characteristics, are readily soluble in alcohol solvents, thereby permitting efficient processes for achieving environmentally acceptable check films, and which fluoropolymers have obtained regulatory approvals from agencies such as the US, EPA, the UK Health and Safety Executive and Environmental Agency, METI in Japan and in Canada are REACH compliant.

Yet another need resides in providing xerographic printing systems, inclusive of multi-color generating systems, where there is selected a transfer assist member that maintains sufficient constant pressure on the substrate to which a developed image is to be transferred, and to substantially eliminate air gaps between the sheet and the photoconductor in that the presence of air gaps can cause air breakdowns in the transfer field.

Moreover, there is a need for transfer assist members that enable suitable and full contact of the developed toner image present on a photoconductor, and a substrate to which the developed image is to be transferred.

Additionally, there is a need for transfer assist members that contain durable compositions that can be economically and efficiently manufactured, and where the amount of energy consumed is reduced.

Yet additionally, there is a need for a multilayered transfer assist member that includes as one layer a check film on the side exposed to a dicorotron/corona element, and which member possesses excellent resistance characteristics.

Also, there is a need for transfer assist members where the check film layer can be generated roll to roll by economic extrusion processing.

Further, there is a need for transfer assist members with a combination of excellent durability, that exert sufficient constant pressure on a substrate and permit the substrate to fully contact the toner developed image on a photoconductor, and where complete transfer to a sheet of a developed image contained on a photoconductor results, such as for example, about 90 to about 100 percent, from about 90 to about 98 percent, from about 95 to about 99 percent, and in embodiments about 100 percent of the toner image is transferred to the copy sheet or other suitable substrate, and wherein blurred final images are minimized or avoided.

There is moreover a need for a transfer assist member, such as a transfer assist blade, that sweeps the backside of the image support substrate with a constant force at the entrance to the transfer region, and itself does not contact the photoconductor.

Moreover, there is a need for composite transfer assist blades that overcome or minimize the problems associated with a single component blade, as a single component blade in order to be flexible enough to prevent image damage often does not provide enough contact force to the back of the sheet to enable complete image transfer thus giving rise to transfer deletions and color shift. When a thick enough blade is used, the stress on the single blade material is very high and thus subject to breaking.

Yet, there is another need for transfer assist members that include check films, and which members are useful in electrophotographic imaging apparatuses, including digital printing where the latent image is produced by a modulated laser beam, or ionographic printing where charge is deposited on a charge retentive surface in response to electronically generated or stored images.

Also, there is a need for transfer assist members that are wear resistant, and that can be used for extended time periods without being replaced.

In addition, there is a need for transfer assist members that contain components that are substantially free of bioaccumulation unlike known main-chain perfluoroalkyl compounds/resins that tend to bioaccumulate.

These and other needs are achievable in embodiments with the transfer assist members and components thereof disclosed herein.

SUMMARY

Disclosed is a transfer assist member comprising a plurality of layers, one of said layers being a check film layer comprising a hydroxyl terminated poly(oxetane) based fluorinated polyether.

Also, disclosed is a transfer assist member comprising a supporting substrate layer, at least one adhesive layer, and a layer comprising a mixture of a conductive component, an acid catalyst, and a hydroxyl terminated poly(oxetane) based fluorinated polyether as represented by at least one of the following formulas/structures wherein each x and y represent the number of segments, and wherein said hydroxyl terminated poly(oxetane) based fluo- rinated polyether is crosslinked with an aminoplast resin, and which member is substantially free of bioaccumulation characteristics.

Additionally, disclosed is a check film comprising a hydroxyl terminated poly(oxetane) based fluorinated polyether, a conductive component, and an optional catalyst, wherein said hydroxyl terminated poly(oxetane) based fluorinated polyether is represented by at least one of the following formulas/structures wherein each x and y represent the number of segments with x being from about 1 to about 40 and y being from about 1 to about 40; and wherein said hydroxyl terminated poly (oxetane) based fluorinated polyether is crosslinked with an aminoplast resin.

There is further disclosed a xerographic process, including color processes, for providing substantially uniform contact between a copy substrate and a toner developed image located on an imaging member, comprising a toner transfer flexible assist blade that comprises a plurality of adhesive bonded layers, wherein said flexible transfer assist blade is adapted to move from a non-operative position spaced from the imaging member to an operative position in contact with the copy substrate on the imaging member, applying pressure against the copy substrate in a direction toward the imaging member, and wherein the plurality of layers comprise a check film layer comprising a crosslinked hydroxyl terminated poly(oxetane) based fluorinated polyether and a conductive filler, such as carbon black, and further including a wear resistant top layer of a polyethylene, obtained from E.I. DuPont, believed to be of the following formula/structure wherein n represents the number of repeating segments of, for example, from about 100,000 to about 300,000, and from about 150,000 to about 225,000.

FIGURES

The following figures are provided to further illustrate the transfer assist members and check films disclosed herein, and where the arrows when present illustrate the direction of movement of the various components shown.

EMBODIMENTS

The disclosed transfer assist members comprise a layer of a hydroxyl terminated poly(oxetane) based fluorinated polyether, inclusive of a layer of a hydroxyl terminated poly(oxetane) based fluorinated polyether crosslinked with an aminoplast resin, which layer may be present as a coating on an optional polymer substrate, and where these members apply pressure against a copy substrate, like a sheet of paper, to create uniform contact between the copy substrate, and a developed image formed on an imaging member like a photoconductor. The transfer assist member, such as for example a blade, presses the copy sheet into contact with at least the developed image on the photoconductive surface to substantially eliminate any spaces or gaps between the copy sheet and the developed image during transfer of the developed image from the photoconductive surface to the copy substrate.

In embodiments of the present disclosure there is provided a xerographic process for achieving substantially uniform contact between a copy substrate and a toner developed image located on an imaging member, which process utilizes a transfer flexible assist member, which member can be in the configuration of a blade that comprises a plurality of adhesive bonded layers, wherein the transfer flexible transfer assist blade is adapted to move from a non-operative position spaced from the imaging member to an operative position in contact with the copy substrate on the imaging member; subsequently applying pressure against the copy substrate in a direction toward the imaging member, and where the transfer assist blade includes a check film layer comprised of a hydroxyl terminated poly(oxetane) based fluorinated polyether crosslinked with an aminoplast resin present on a polymer substrate of a polyalkylene terephthalate, a polyester, or mixtures thereof, and optionally where the check film contains at least one of a second resin, and a conductive filler, silica, a plasticizer, a fluoropolymer, a leveling agent, and mixtures thereof.

The disclosed transfer assist member in, for example, the configuration of a transfer assist blade (TAB) can be used in conjunction with a corona device to perform transfer, which involves moving toner from a photoconductor.

Figure 1:
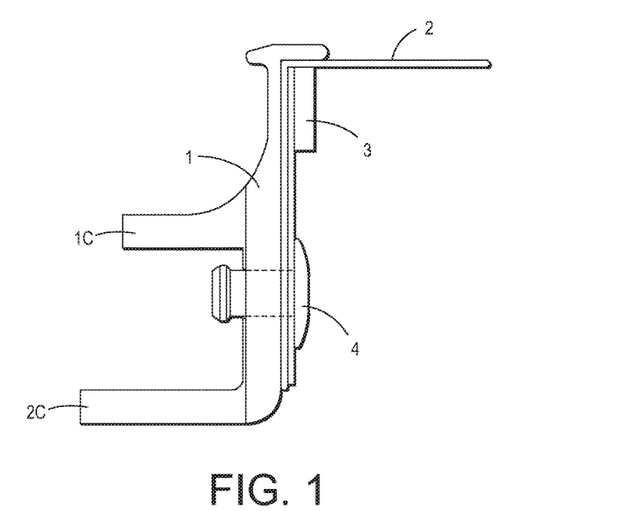
FIG. 1 and FIG. 1A illustrate exemplary side views of the transfer assist member of the present disclosure.

FIG. 1 illustrates a side view of the transfer assist member assembly of the present disclosure. More specifically, illustrated in FIG. 1 is an aluminum component 1 to secure the member, such as a blade (illustrated herein by the transfer assist member petal assembly 2), and which component 1 is attached to the transfer assist member petal assembly 2, and where the petal assembly 2 is comprised of the multi-layer blade member as shown in FIG. 3, and where the numeral or designation 3 (shown in FIGS. 1, 1A and 2) represents a stainless steel clamp, and the designation 4 (shown in FIGS. 1, 1A, and 2) represents an aluminum rivet, whereby the clamp 3 and rivet 4 retain in position the petal assembly 2, between clamp 3 and the aluminum component 1, and where 1C and 2C represent spaced-apart integral arms of aluminum component 1.

Figure 1A:
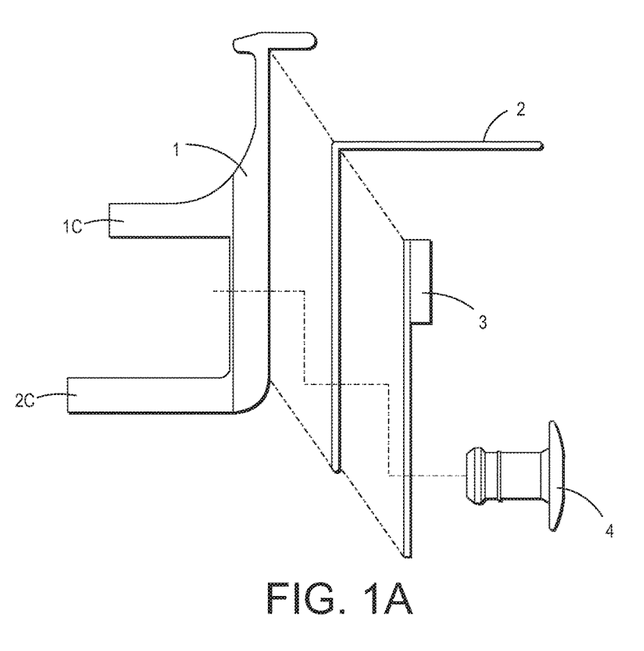

The corresponding FIG. 1A illustrates the disassembled elements or form of the transfer assist members of the present disclosure where the designations 1, 2, 3, 4, 1C and 2C for this FIG. 1A are the same as those designations as shown in FIG. 1.

Figure 2:
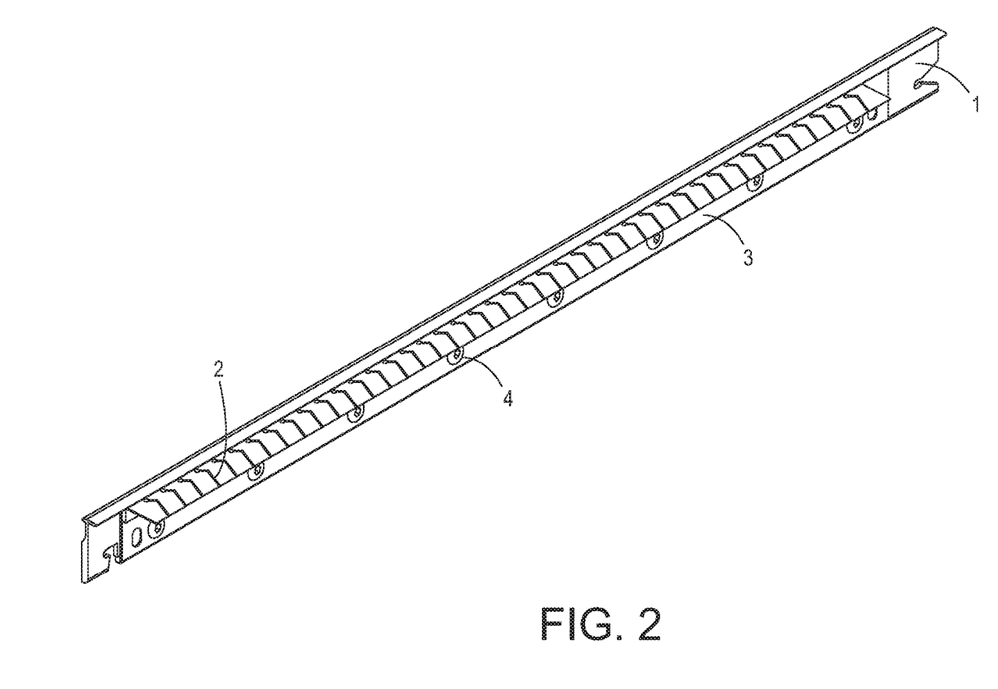
FIG. 2 illustrates an exemplary view of the transfer assist member assembly of the present disclosure.
Figure 3:
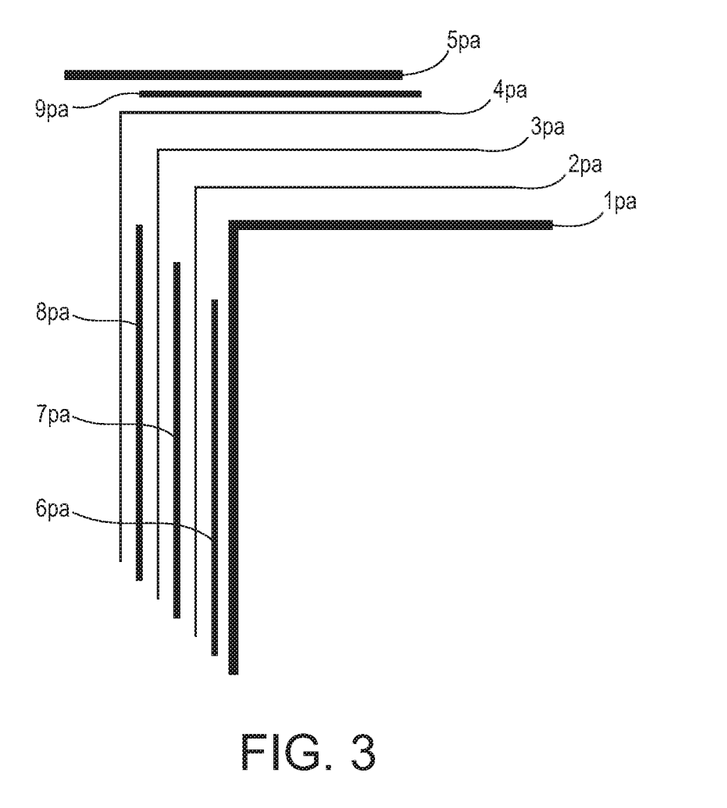
FIG. 3 illustrates an isometric exemplary view of the transfer assist member petal of the present disclosure.

FIG. 2 illustrates another view of the transfer assist member assembly of the present disclosure, and where the designations 1, 2, 3, 4, for this Figure, are the same as the designations as presented in FIG. 1, and include aluminum component 1 to secure the member, such as a blade, and which element is generated, for example, by conventional extrusion processes, attached to the transfer assist member petal assembly 2, and where the petal assembly 2 comprises the five-layer blade member as shown in FIG. 3, and where the numeral or designation 3 in FIG. 2 represents a stainless steel clamp, and the designation 4 represents an aluminum rivet, and which clamp and rivet retain in position the petal assembly 2, between clamp 3 and aluminum component 1.

FIG. 3 illustrates the preassembled elements or components as well as certain additional components of the transfer assist member petal assembly of the present disclosure. More specifically, shown in FIG. 3 is an embodiment of the transfer assist member petal assembly 2 of the present disclosure. Specifically, the transfer assist member petal assembly 2 (shown in FIGS. 1, 1A and 2) comprises a check film layer 1pa comprising a crosslinked hydroxyl terminated poly(oxetane) based fluorinated polyether overcoat layer present on at least one polymer substrate, such as polymer layers 2pa, 3pa, and 4pa. The transfer assist member petal assembly 2 further includes a top overcoat wear resistant layer 5pa, and may also include optional adhesive layers 6pa, 7pa, 8pa and 9pa between the respective pairs of layers 1pa and 2pa, 2pa and 3pa, 3pa and 4pa, and 4pa and 5pa, as shown in FIG. 3.

Figure 4:
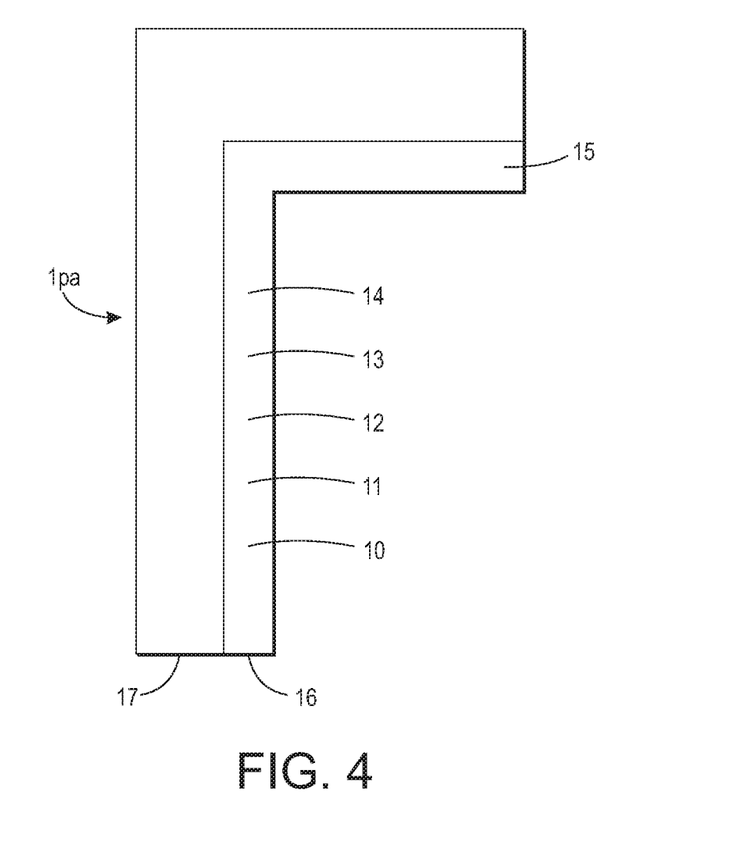
FIG. 4 illustrates an exemplary pre-assembled view of the check film or partially conductive film of the present disclosure.

FIG. 4 further illustrates certain additional embodiments of the components and compositions of the transfer assist member check films of the present disclosure. More specifically, shown in FIG. 4 is an embodiment of the check film 1pa comprising a supporting substrate layer 17, and a layer 16 comprising a partially conductive crosslinked hydroxyl terminated poly(oxetane) based fluorinated polyether, including an optional second resin of, for example, polyvinyl butyral 10, optional conductive components or fillers 11, optional silicas 12, optional fluoropolymer particles 13, optional plasticizers 14, and optional leveling agents 15, and wherein in embodiments layers 16 and 17 are inseparable layers.

Therefore, in an embodiment of the present disclosure there is provided a transfer assist member, such as a blade, comprising a hydroxyl terminated poly(oxetane) based fluorinated polyether crosslinked with an aminoplast resin, which member has, for example, a resistance of from about $1 \times 10^5$ ohm to about $1 \times 10^{10}$ ohm, from about $1 \times 10^7$ to about $1 \times 10^{10}$ ohm, from about $1 \times 10^7$ to about $10 \times 10^{10}$ ohm, from about $1 \times 10^7$ to about $1 \times 10^9$ ohm, from about $1 \times 10^6$ to about $1 \times 10^9$ ohm, from about $1 \times 10^8$ to about $9 \times 10^8$ ohm, and more specifically a resistance of about $4.8 \times 10^8$ ohm as measured with a known Resistance Meter, and which member more specifically comprises an aminoplast crosslinked hydroxyl terminated poly(oxetane) based fluorinated polyether overcoat contained on an optional supporting substrate, and where the crosslinked mixture can further include a second resin, at least one conductive component, such as carbon black, metal oxides or mixed metal oxides, conducting polymers, such as polyaniline, polythiophene or polypyrrole, a catalyst, a silicone or fluoro leveling agent, a plasticizer, a silica and a fluoropolymer, and where the transfer assist member and also the check film is, for example, from 1 to about 10 layers, from about 2 to about 10 layers, from about 2 to about 8 layers, from about 2 to about 5 layers, from about 3 to about 7 layers, or from about 3 to about 5 layers.

Supporting Substrates

Examples of suitable substrates, such as supporting substrate 17 and polymers are polyesters, such as MYLAR®, MELINEX®, TEIJIN®, TETORON®, TEONEX®, polyethylene terephthalate (PET), polybutylene terephthalate (PBT), and polyethylene naphthalate (PEN), polyamides, polyetherimides, polyamideimides, polyimides, polyphenyl sulfides, polyether ether ketones, polysulfones, polycarbonates, polyvinyl halides, polyolefins, mixtures thereof, and the like. These and other similar supporting substrate polymers are available from E.I. DuPont Company or SKC Incorporated.

Polycarbonate polymer supporting substrate examples that can be selected for the disclosed members include poly(4,4'-isopropylidene-diphenylene) carbonate (also referred to as bisphenol-A-polycarbonate), poly(4,4'-cyclohexylidine diphenylene) carbonate (also referred to as bisphenol-Z-polycarbonate), poly(4,4'-isopropylidene-3,3'-dimethyl-diphenyl) carbonate (also referred to as bisphenol-C-polycarbonate), and the like. In embodiments, the polymer supporting substrates are comprised of bisphenol-A-polycarbonate resins, commercially available as MAKROLON® or FPC® with, for example, a weight average molecular weight of from about 50,000 to about 500,000, or from about 225,000 to about 425,000.

Polysulfone supporting substrate examples selected for the disclosed members include polyphenylsulfones such as RADEL® R-5000NT and 5900NT, polysulfones such as UDEL® P-1700, P-3500, and polyethersulfones such as RADEL® A-200A, AG-210NT, AG-320NT, VERADEL® 3000P, 3100P, 3200P, all available from Solvay Advanced Polymers, LLC, Alpharetta, Ga.

Polyphenylene sulfide supporting substrate polymers that can be selected for the disclosed members include RYTON®, a polyphenylene sulfide available from Chevron Phillips as a crosslinked polymer; FORTRON®, a polyphenylene sulfide available from Ticona Incorporated as a linear polymer, and SULFAR®, a polyphenylene sulfide available from Testori Incorporated.

Supporting substrate polyamide polymers that can be selected for the disclosed transfer assist members include aliphatic polyamides, such as Nylon 6 and Nylon 66 available from DuPont, semi-aromatic polyamides, or polyphthalamides such as TROGAMID® 6T available from Evonik Industries, and aromatic polyamides, or aramides, such as KEVLAR® and NOMEX® available from DuPont, and TEIJINCONEX®, TWARON® and TECHNORA® available from Teijin Incorporated.

Examples of polyether ether ketone polymers that can be selected for the disclosed members supporting substrates include VICTREX® PEEK 90G, 150G, 450G, 150FC30, 450FC30, 150FW30, 450FE20, WG101, WG102, ESD101, all available from VICTREX Manufacturing Limited.

Polyamideimide examples that can be selected for the disclosed members supporting substrates include TORLON® AI-10 ($T_g$=272° C.), commercially available from Solvay Advanced Polymers, LLC, Alpharetta, Ga.

Examples of polyetherimide polymers that can be selected as supporting substrates for the disclosed members, where $T_g$ represents the glass transition temperature as determined by a number of known methods, and more specifically by Differential Scanning calorimetry (DSC), include ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Examples of polyimide polymers that can be selected as supporting substrates for the disclosed members include P84® polyimide available from HP Polymer Inc., Lewisville, Tex.

The substrate can be of a number of different thicknesses, such as from about 25 microns to about 250 microns, from about 50 microns to about 200 microns, or from about 75 microns to about 150 microns, and where the check film total thickness is, for example, from about 1 mil to about 10 mils, from about 1 to about 8 mils, from about 1 mil to about 5 mils, from about 2 mils to about 4 mils, and more specifically, about 3.8 mils, which thicknesses can be measured by known means such as a Permascope.

Fluoro Components or Fluoride Containing Components

The disclosed environmentally acceptable fluoro components or fluoride containing components include, for example, fluorinated polyethers, such as hydroxyl terminated fluorinated polyethers that are based on poly(oxetane) polymers, reference for example, U.S. Pat. No. 7,087,710, the disclosure of which is totally incorporated herein by reference.

The disclosed environmentally friendly fluorinated polyethers are based on poly(oxetane) polymers available from OMNOVA Solutions. Compared to certain telomer-based and other conventional fluorochemicals, such as PFA and PTFE, the disclosed poly(oxetane) based fluorinated polyethers are substantially free of, or free of bioaccumulation resulting in very low and acceptable environmental impacts. Regulatory approvals for the disclosed fluorinated polyethers, such as the hydroxyl terminated fluorinated polyethers that are based on poly(oxetane) polymers, have been obtained from agencies such as the US EPA, the UK Health and Safety Executive and Environmental Agency, Japan METI and REACH in Canada.

Examples of fluoro components or fluoride containing components selected for the disclosed transfer assist members and check films of the present disclosure include hydroxyl terminated poly(oxetane) based fluorinated polyethers as represented by at least one of the following formulas/structures, and mixtures thereof -continued where x and y represent the number of repeating segments, and more specifically, for example, wherein x is, for example, from about 1 to about 40, from about 2 to about 20, from about 5 to about 15, and from about 5 to about 12; and y is, for example, from about 1 to about 40, from about 2 to about 20, from about 5 to about 15, and from 5 to about 10; and the sum of x and y is, for example, from about 2 to about 80, from about 2 to about 60, from about 6 to about 20, from about 4 to about 30, and from about 7 to about 18.

The fluorine or fluoride (F) content of the hydroxyl terminated poly(oxetane) based fluorinated polyethers as determined by known methods, such as IR spectroscopy, are, for example, from about 10 to about 70 weight percent, from about 20 to about 50 weight percent, and from about 45 to about 50 weight percent, with the weight average molecular weight $M_w$ of the hydroxyl terminated poly(oxetane) based fluorinated polyethers, as determined by GPC analysis, being, for example, from about 300 to about 10,000, from about 500 to about 8,000, from about 1,000 to about 6,000, from about 2,500 to about 5,500, and from about 1,500 to about 1,900. The hydroxyl number of the hydroxyl terminated poly(oxetane) based fluorinated polyethers as determined by known methods, such as gravimetric analysis, are, for example, from about 20 to about 200 milligrams KOH/gram, from about 50 to about 125 milligrams KOH/gram, from about 75 to about 100 milligrams KOH/gram, and from about 65 to about 70 milligrams KOH/gram.

Specific examples of the environmentally acceptable hydroxyl terminated poly(oxetane) based fluorinated polyethers selected for the transfer assist members of the present disclosure, and obtainable from OMNOVA Solutions Incorporated, are POLYFOX™ PF-7002, with a weight average molecular weight of about 1,670±200, a fluoride (F) content of about 46 percent, and a hydroxyl number of about 67.2±8 milligrams KOH/g; POLYFOX™ PF-636, having a weight average molecular weight of about 1,150, a fluoride (F) content of about 27.6 percent, and a hydroxyl number of about 99.5 milligrams KOH/gram; POLYFOX™ PF-6320, (x+y is equal to, or is about 20) having a weight average molecular weight of about 3,480, a fluoride content (F) of about 29.9 percent, and a hydroxyl number of about 32.2 milligrams KOH/gram; POLYFOX™ PF-656, (x+y is equal to, or is about 6) with a weight average molecular weight of about 1,490, a fluoride content (F) of about 34.7 percent, and a hydroxyl number of about 75.2 milligrams KOH/gram; POLYFOX™ PF-6520, (x+y is equal to, or is about 20) having a weight average molecular weight of about 4,480, a fluoride content (F) of about 39.3 percent, and a hydroxyl number of about 25 milligrams KOH/gram; POLYFOX™ PF-151N, having a weight average molecular weight of about 2,815, a fluorine content (F) of about 24.5 percent, and a hydroxyl number of about 39.9 milligrams KOH/gram; POLYFOX™ PF-154N, having a weight average molecular weight of about 3,464, a fluoride content (F) of about 19.5 percent, and a hydroxyl number of about 32.4 milligrams KOH/gram; and POLYFOX™ PF-159, with a weight average molecular weight of about 3,300, a fluoride content (F) of about 15.4 percent, and a hydroxyl number of about 34 milligrams KOH/gram, and mixtures thereof.

Various effective amounts of the hydroxyl terminated poly(oxetane) based fluorinated polyethers can be selected, such as for example, from about 1 to about 75 weight percent, from about 5 to about 70 weight percent, from about 10 to about 50 weight percent, from about 10 to about 40 weight percent, and from about 15 to about 35 weight percent, based on the percent solids present.

It is known that many fluoro containing substances are not environmentally friendly since they tend to bioaccumulate. For example, polytetrafluoroethylene (PTFE), namely TEFLON®, and perfluoroalkyl compounds (PFOA) are not considered environmentally acceptable to the extent that the Environmental Protection Agency (EPA) required the withdrawal of these chemicals to avoid environmental pollution. In 2002, the Organization for Economic Co-operation and Development reported that these substances are bio-persistent, tend to accumulate in different tissues of living organisms and are toxic to mammalians

Therefore, compared, for example, to certain telomer-based fluoro containing polymers and other conventional fluorochemicals, such as perfluoropolyethers (FLUOROLINK®), PFA, and PTFE, all of which have various degrees of bioaccumulation, the disclosed poly(oxetane) based fluorinated polyethers, especially when crosslinked with an aminoplast resin, are free or substantially free, of bioaccumulation, thus allowing for reduced and low environmental impacts, and in addition are soluble or dispersible in a variety of common organic solvents including ketones, alcohols and esters.

Aminoplast Resins

Aminoplast resins refer, for example, to a type of amino resin obtained from nitrogen-containing substances and formaldehyde, wherein the nitrogen-containing substance includes, for example, resins of melamine, urea, benzoguanamine, glycoluril, and the like.

Melamine resins that can be reacted with formaldehyde to form aminoplast resins are available under various trade names, including but not limited to CYMEL™ BEETLE™ DYNOMIN™, BECKAMINE™, UFR™, BAKELITE™, ISOMIN™, MELAICAR™, MELBRITE™, MELMEX™, MELOPAS™, RESART™, and ULTRAPAS™.

Examples of melamine resins can be represented by the following formula/structure wherein $R_1$, $R_2$, $R_3$, $R_4$, $R_5$ and $R_6$ each independently represent at least one of a hydrogen atom, and an alkyl group with, for example, from 1 to about 12 carbon atoms, from 1 to about 8 carbon atoms, and from 1 to about 4 carbon atoms. Examples of specific alkyl groups include methyl, ethyl, propyl, butyl, pentyl, hexyl, heptyl, octyl, nonyl, decyl, and the like.

Specific examples of melamine containing resins that can be reacted with formaldehyde to form aminoplast resins, and melamine formaldehyde resins, include methylated and/or butylated melamine formaldehyde resins, such as those commercially available from Cytec Industries, as CYMEL® 303, 104, MM-100, and the like; NIKANAC® M-390 available from Sanwa Chemical Company Limited of Japan, and the like. The melamine formaldehyde resins, which can be water-soluble, dispersible or non-dispersible, may exhibit a high percent of alkylation, such as from about 75 to about 95 percent, from about 80 to about 95 percent, from about 75 to about 90 percent, and from about 85 to about 90 percent; and partially or mixed alkylated/alkoxylated resins of, for example, having from about 40 to about 65 percent alkylation/alkoxylation; methylated, n-butylated or isobutylated resins; highly methylated melamine resins such as CYMEL® 350, 9370; methylated imino melamine resins (partially methylolated and highly alkylated) such as CYMEL® 323, 327; partially methylated melamine resins (highly methylolated and partially methylated) such as CYMEL® 373, 370; high solids mixed ether melamine resins such as CYMEL® 1130, 324; n-butylated melamine resins such as CYMEL® 1151, 615; n-butylated high imino melamine resins such as CYMEL® 1158; and iso-butylated melamine resins such as CYMEL® 255-10. CYMEL® melamine resins are commercially available from CYTEC Industries, Inc.

The disclosed herein CYMEL® 303, available from Cytec Industries as $(CH_3OCH_2)_6N_3C_3N_3$, can be represented by the following formula/structure Urea resin examples that can be reacted with formaldehyde are known under various trade names, including but not limited to CYMEL™, BEETLE™, DYNOMIN™, BECKAMINE™, and AMIREME™.

Benzoguanamine resins examples selected as the disclosed crosslinkers can be considered amino resins prepared from benzoguanamine and formaldehyde. Examples of benzoguanamine resins are known under various trade names, including but not limited to CYMEL™, BEETLE™, and UFORMITE™; and CYMEL® 1123, and CYMEL® 5010, both commercially available from Allnex Belgium SA/NV.

Examples of the disclosed benzoguanamine resins can be represented by the following formula/structure in which $R_1$, $R_2$, $R_3$, and $R_4$ each independently represents a hydrogen atom or an alkyl chain with 1 to 8 carbon atoms, or with 1 to 4 carbon atoms.

In embodiments, the benzoguanamine resins are water-soluble, dispersible or indispersible. In various embodiments, the benzoguanamine resin can be highly alkylated/alkoxylated, partially alkylated/alkoxylated, or mixed alkylated/alkoxylated. In various embodiments, the benzoguanamine resin can be methylated, n-butylated or isobutylated. Glycoluril resin examples can be represented by the following formulas/structure in which $R_1$, $R_2$, $R_3$, and $R_4$ each independently represents a hydrogen atom or an alkyl chain with 1 to 8 carbon atoms, or with 1 to 4 carbon atoms.

In embodiments, the disclosed glycoluril resins are water-soluble, dispersible or indispersible, and these resins can be highly alkylated/alkoxylated, partially alkylated/alkoxylated, or mixed alkylated/alkoxylated. Examples of glycoluril resins include CYMEL® 1170, 1171, 1172, all commercially available from Allnex Belgium SA/NV.

The aminoplast resin, such as the melamine formaldehyde resins disclosed herein, can be selected in an amount of, for example, from about 1 to about 95 weight percent, from about 5 to about 85 weight percent, from about 10 to about 90 weight percent, and from about 10 to about 75 weight percent based on the total weight, or percent of the solids such as the crosslinked reaction product of the hydroxyl terminated poly(oxetane) based fluorinated polyethers and the aminoplast resin, the conductive component when present, the second resin when present, the catalyst when present and other components disclosed herein when present.

Optional Catalysts

A number of catalysts can be selected for inclusion in the crosslinked reaction product of the hydroxyl terminated poly(oxetane) based fluorinated polyethers, the aminoplast resin, and the disclosed optional components, and which catalysts can function to assist in and accelerate the crosslinking reaction.

Acid catalyst examples selected include p-toluene sulfonic acid (p-TSA) types and their blocked forms such as CYCAT® 4040, 4045, available from Allnex Belgium SA/NV, and K-CURE® 1040, 1040W, NACURE® XP-357, (a blocked p-toluenesulfonic acid in methanol, pH of 2-4, dissociation temperature of about 65° C.), 2107, 2500, 2501, 2522, 2530, 2547, 2558, all available from King Industries, Inc., Science Road, CT; dinonyl naphthalene disulfonic acid (DNNDSA) types and their blocked forms such as CYCAT® 500, all available from Allnex Belgium SA/NV; NACURE® 155, X49-110, 3525, 3327, 3483, all available from King Industries, Inc., Science Road, CT; dinonyl naphthalene sulfonic acid (DNNSA) types and their blocked forms such as NACURE® 1051, 1323, 1419, 1557, 1953, all available from King Industries, Inc., Science Road, CT; dodecylbenzenesulfonic acid (DDBSA) types and their blocked forms such as CYCAT® 600, available from Allnex Belgium SA/NV, and NACURE® 5076, 5225, 5414, 5528, 5925, all available from King Industries, Inc., Science Road, CT; acid phosphate types and their blocked forms such as CYCAT® 296-9, available from Allnex Belgium SA/NV, and NACURE® 4054, XC-C207, 4167, XP-297, 4575, all available from King Industries, Inc., Science Road, CT.

Specific examples of acid catalysts selected to assist in and accelerate the crosslinking reaction include p-toluene sulfonic acid (p-TSA), dinonyl naphthalene disulfonic acid (DNNDSA), dinonyl naphthalene sulfonic acid (DNNSA), dodecylbenzenesulfonic acid (DDBSA), alkyl acid phosphates, phenyl acid phosphates, oxalic acid, maleic acid, carbolic acid, ascorbic acid, malonic acid, succinic acid, tartaric acid, citric acid, methane sulfonic acid, and mixtures thereof, and more specifically, p-toluene sulfonic acid.

The amount of catalyst used is, for example, from about 0.01 to about 10 weight percent, from about 0.01 to about 5 weight percent, from about 0.1 to about 8 weight percent, from about 1 to about 5 weight percent, or from about 1 to about 3 weight percent based on the solids present. The primary purposes of the catalysts are to assist with curing, and in the crosslinking of the hydroxyl terminated poly(oxetane) based fluorinated polyethers disclosed mixtures.

Subsequent to curing of the disclosed mixture in the presence of a catalyst, which curing can be accomplished quickly, such as for example, from about 5 to about 20 minutes, from about 10 to about 15 minutes, and more specifically, about 10 minutes, there results a crosslinked product, and where the curing can be accomplished by heating at temperatures equal to or exceeding about 80° C. for extended time periods. More specifically, the curing of the disclosed hydroxyl terminated poly(oxetane) based fluorinated polyether and aminoplast mixture, in the absence of a catalyst or the presence of a catalyst, can be accomplished at various suitable temperatures, such as for example, from about 80° C. to about 220° C., from about 100° C. to about 180° C., and from about 125° C. to about 140° C. for a period of, for example, from about 1 to about 40 minutes, from about 3 to about 30 minutes, from about 5 to about 20 minutes, from about 10 to about 15 minutes, and yet more specifically, wherein the curing or drying time is from about 5 to about 10 minutes.

The crosslinked hydroxyl terminated poly(oxetane) based fluorinated polyethers can be present in the disclosed mixtures in a number of differing effective amounts, such as for example, a total of 100 percent in those situations when no conductive components and no other optional components, such as plasticizers and silicas, are present; from about 90 to about 99 weight percent, from about 80 to about 90 weight percent, from about 65 to about 99 weight percent, from about 60 to about 90 weight percent, from about 70 to about 90 weight percent, from about 65 to about 75 weight percent, or from about 50 to about 60 weight percent providing the total percent of components present is about 100 percent, and wherein the weight percent is based on the total solids, such as the solids of the hydroxyl terminated poly(oxetane) based fluorinated polyethers, the second resin when present, the conductive component or filler when present, the plasticizer when present, leveling agent when present, catalyst when present, silica when present, and the fluoropolymers when present.

While not desiring to be limited by theory, it is believed that the crosslinking percentage of the hydroxyl terminated poly(oxetane) based fluorinated polyether/aminoplast resin, subsequent to curing, is, for example, as illustrated herein, such as from about 40 to about 100 percent, from about 95 to about 99 percent, from about 55 to about 99 percent, from about 55 to about 90 percent, from about 50 to about 99 percent, from about 50 to about 95 percent, from about 75 to about 99 percent, from about 80 to about 100 percent, from about 80 to about 98 percent, from about 95 to about 99, from about 77 to about 97 percent, from about 80 to about 95 percent, or from about 70 to about 90 percent, and which crosslinking percentages were determined by Fourier Transform Infrared (FTIR) Spectroscopy.

The crosslinked containing mixture in, for example, the configuration of a layer, can be of a number of differing thicknesses depending, for example, on the thicknesses of the other layers that may be present, and the components present in each layer, which crosslinked layer thicknesses are, for example, from about 0.1 to about 50 microns, from about 1 to about 40 microns, or from about 5 to about 20 microns.

Various specific processes can be utilized to obtain crosslinking of the hydroxyl terminated poly(oxetane) based fluorinated polyether. For example, a hydroxyl terminated poly(oxetane) based fluorinated polyether, a solvent, an aminoplast resin, and an acid catalyst can be heated and cured with stirring to a temperature of from about 120° C. to about 200° C., or from about 150° C. to about 175° C. for a period of time of, for example, from about 30 to about 75 minutes, and from about 40 to about 60 minutes, followed by cooling the resulting mixture to room temperature of about 25° C. Also, the generated crosslinked mixture can include the catalyst in the amounts illustrated herein.

Optional Second Resins

Examples of optional second resins or co-resins present in the disclosed crosslinked layer mixture in amounts of, for example, from about 1 to about 20 weight percent, from about 1 to about 15 weight percent, from about 1 to about 10 weight percent, and more specifically, from about 7 to about 9 weight percent, include polyvinyl butyrals (PVB), such as commercially available S-LEC® BL-1 (weight average molecular weight of about 19,000, hydroxyl content of about 36 mol percent), BM-1 (weight average molecular weight of about 40,000, hydroxyl content of about 34 mol percent), BX-1 (weight average molecular weight of about 100,000, hydroxyl content of about 33 mol percent), and KS-1 (weight average molecular weight of about 27,000, hydroxyl content of about 25 mol percent), all available from SEKISUI Chemical Company, Limited; polyvinyl formals, and a partially acetylated polyvinyl butyrals, where the butyral moieties are modified in part with formal, acetoacetal, or the like; mixtures thereof, and the like.

Optional Conductive Components

The crosslinked mixture can further comprise optional conductive components, such as known carbon forms like carbon black, graphite, carbon nanotubes, fullerene, graphene, and the like; metal oxides, mixed metal oxides; conducting polymers, such as polyaniline, polythiophene, polypyrrole, mixtures thereof, and the like.

Examples of carbon black conductive components that can be selected for incorporation into the illustrated herein crosslinked mixture include KETJENBLACK® carbon blacks available from AkzoNobel Functional Chemicals; special black 4 (B.E.T. surface area of about 180 m$^2$/g, DBP absorption of about 1.8 ml/g, primary particle diameter of about 25 nanometers) available from Evonik-Degussa; special black 5 (B.E.T. surface area of about 240 m$^2$/g, DBP absorption of about 1.41 ml/g, primary particle diameter of about 20 nanometers); color black FW1 (B.E.T. surface area of about 320 m$^2$/g, DBP absorption of about 2.89 ml/g, primary particle diameter of about 13 nanometers); color black FW2 (B.E.T. surface area of about 460 m$^2$/g, DBP absorption of about 4.82 ml/g, primary particle diameter of about 13 nanometers); color black FW200 (B.E.T. surface area of about 460 m$^2$/g, DBP absorption of about 4.6 ml/g, primary particle diameter of about 13 nanometers), all available from Evonik-Degussa; and VULCAN® carbon blacks, REGAL® carbon blacks, MONARCH® carbon blacks, EMPEROR® carbon blacks, and BLACK PEARLS® carbon blacks all available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), EMPEROR® E1200, EMPEROR® E1600, VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); special carbon blacks available from Evonik Incorporated; and Channel carbon blacks available from Evonik-Degussa. Other known suitable carbon blacks not specifically disclosed herein may be selected as the filler or conductive component.

Examples of polyaniline conductive components that can be included in the disclosed crosslinked mixtures are PANIPOL™ F, commercially available from Panipol Oy, Finland, and known lignosulfonic acid grafted polyanilines. These polyanilines usually have a relatively small particle size diameter of, for example, from about 0.5 to about 5 microns, from about 1.1 to about 2.3 microns, or from about 1.5 to about 1.9 microns.

Metal oxide conductive components that can be selected include, for example, tin oxide, antimony doped tin oxide, indium oxide, indium tin oxide, zinc oxide, titanium oxides, mixtures thereof, and the like.

When present, the conductive component or conductive components can be selected in an amount of, for example, from about 1 to about 70 weight percent, from about 3 to about 60 weight percent, from about 3 to about 40 weight percent, from about 4 to about 30 weight percent, from about 5 to about 20 weight percent, from about 10 to about 30 percent, from about 8 to about 25 weight percent, or from about 3 to about 10 weight percent of the total solids.

Optional Plasticizers

Optional plasticizers, which can be considered plasticizers that primarily increase the plasticity or fluidity of the disclosed transfer assist member crosslinked mixtures, include diethyl phthalate, dioctyl phthalate, diallyl phthalate, polypropylene glycol dibenzoate, di-2-ethyl hexyl phthalate, diisononyl phthalate, di-2-propyl heptyl phthalate, diisodecyl phthalate, di-2-ethyl hexyl terephthalate, and other known suitable plasticizers. The plasticizers can be present in various effective amounts, such as for example, from about 0.1 to about 30 weight percent, from about 1 to about 20 weight percent, and from about 3 to about 15 weight percent based on the solids present.

Optional Silicas

Optional silica examples, which can contribute to the wear resistant properties of the transfer assist members, check films, and blades illustrated herein, include silica, fumed silicas, surface treated silicas, other known silicas, such as AEROSIL R972®, mixtures thereof, and the like. The silicas are selected in various effective amounts, such as for example, from about 0.1 to about 20 weight percent, from about 1 to about 15 weight percent, and from about 2 to about 10 weight percent based on the solids present.

Optional Fluoropolymers

Optional fluoropolymers, which can contribute to the wear resistant properties of the members illustrated herein, include tetrafluoroethylene polymers (PTFE), trifluorochloroethylene polymers, hexafluoropropylene polymers, vinyl fluoride polymers, vinylidene fluoride polymers, difluorodichloroethylene polymers, or copolymers thereof. The fluoropolymers are selected in various effective amounts, such as for example, from about 0.1 to about 20 weight percent, from about 1 to about 15 weight percent, and from about 2 to about 10 weight percent based on the present solids.

Optional Leveling Agents

Optional leveling agent examples, which can contribute to the smoothness characteristics, such as enabling smooth coating surfaces with minimal or no blemishes or protrusions, of the members illustrated herein include polysiloxane polymers, known suitable fluoropolymers, and mixtures thereof. The optional polysiloxane polymers include, for example, a polyester modified polydimethylsiloxane with the trade name of BYK® 310 (about 25 weight percent in xylene) and BYK® 370 (about 25 weight percent in xylene/alkylbenzenes/cyclohexanone/monophenylglycol=75/11/7/7); a polyether modified polydimethylsiloxane with the trade name of BYK® 333, BYK® 330 (about 51 weight percent in methoxypropylacetate) and BYK® 344 (about 52.3 weight percent in xylene/isobutanol=80/20), BYK®-SILCLEAN 3710 and 3720 (about 25 weight percent in methoxypropanol); a polyacrylate modified polydimethylsiloxane with the trade name of BYK®-SILCLEAN 3700 (about 25 weight percent in methoxypropylacetate); or a polyester polyether modified polydimethylsiloxane with the trade name of BYK® 375 (about 25 weight percent in di-propylene glycol monomethyl ether), all commercially available from BYK Chemical. The leveling agents for the check film layer are selected in various effective amounts, such as for example, from about 0.01 to about 5 weight percent, from about 0.1 to about 3 weight percent, and from about 0.2 to about 1 weight percent based on the solids present.

Optional Adhesives

The optional adhesive layers can be included between each of the transfer assist member layers, or partially included at the edges between each of the member layers. For example, the adhesive layers designated, for example, as 6pa, 7pa, 8pa, and 9pa in FIG. 3, can be included between each of the transfer assist member layers, or partially included at the edges between each of the member layers, each of the adhesive layers being of a thickness of, for example, from about 1 to about 50 millimeters, from about 10 to about 40 millimeters, or from about 15 to about 25 millimeters.

The optional adhesive layers may also be included between each of the layers of the transfer assist members of FIG. 3, such as on the vertical sides between the substrate side of layer 1pa and layer 2pa, layers 2pa and 3pa, layers 3pa and 4pa, and on the horizontal sides between layer 4pa and the top wear layer 5pa. The horizontal sides of layers 1pa, 2pa, 3pa and 4pa are usually not bonded together.

A number of known adhesives can be selected for each adhesive layer, inclusive of suitable polyesters, a 3M™ Double Coated Tape 444, which is a 3.9 mil thick, 300 high tack acrylic adhesive with a 0.5 mil thick polyester carrier, white, densified Kraft paper liner (55 lbs.), mixtures thereof, and the like.

Optional Solvents

Examples of solvents selected for formation of the members illustrated herein, especially for the formation of the dispersions of the disclosed crosslinked mixtures, which solvents can be selected in an amount of, for example, from about 60 to about 95 weight percent, or from about 70 to about 90 weight percent of the total mixture components weight include, for example, alcohols, such as methanol, ethanol, propanol, butanol, pentanol, oleyl alcohol, benzyl alcohol, lauryl alcohol and alcohol ethers of, for example, the alkyl ethers of ethylene glycol and other known alkyl alcohols, mixtures thereof, and the like. Diluents that can be mixed with the solvents in amounts of, for example, from about 1 to about 25 weight percent, and from 1 to about 10 weight percent based on the weight of the solvent, where the diluents include aromatic hydrocarbons, ethyl acetate, acetone, cyclohexanone and acetanilide.

Wear Resistant Layer

The wear resistant layer included in the transfer assist members, and more specifically, as the top bonded layer, such as in the top layer of the check film designated, for example, by the numeral 5pa, illustrated in FIG. 3, can be comprised of an ultra-high molecular weight (UHMW) polyethylene with, for example, a low coefficient of friction, excellent impact strength, and possessing chemical and moisture resistance.

Selected as ultra-high molecular weight (UHMW), polyethylenes available, for example, from the Garland Manufacturing Company, comprise long chains of polyethylene of the formula illustrated below, which may align in isotactic configuration (where substituent groups all lie above or below the plane of the main chain), or syndiotactic configuration (where substituent groups lie alternatively above and below the plane), or atactic configuration (where substituent groups randomly lie above and below the plane), and which derives its protection properties mostly from the length of each individual molecule (chain)

wherein n represents the number of repeating segments of at least about 100,000, and more specifically, from about 100,000 to about 300,000, from about 125,000 to about 175,000, and from about 150,000 to about 225,000, wherein the wear resistant layer is, for example, situated as a top layer of the disclosed plurality of layers. In those instances where the transfer assist member comprises a plurality of layers of, for example, three polyester layers, these layers can be situated between the check film and the wear resistant layer.

The thickness of the disclosed wear resistant top layer can vary, depending, for example, on the thicknesses of the other layers that may be present and the components in each layer. Thus, for example, the thicknesses of the top wear resistant layer can vary from about 1 mil to about 20 mil, from about 1 mil to about 15 mil, from about 2 mil to about 10 mil, or from about 1 mil to about 5 mil as determined by known means such as a Permascope.

Also included within the scope of the present disclosure are methods of imaging and printing with the transfer assist members and check films illustrated herein. These methods generally involve the formation of an electrostatic latent image on an imaging photoconductive member, followed by developing the image with a toner composition comprised, for example, of a thermoplastic resin, a colorant, such as a pigment, dye, or mixtures thereof, a charge additive, internal additives like waxes, and surface additives, such as for example, silica, coated silicas, aminosilanes, and the like, reference U.S. Pat. Nos. 4,560,635 and 4,338,390, the disclosures of each of these patents being totally incorporated herein by reference; subsequently transferring with the disclosed transfer assist member the toner image to a suitable image receiving substrate, and permanently affixing the image thereto. In those environments wherein a printing mode is selected, the imaging method involves the same operation with the exception that exposure can be accomplished with a laser device or image bar. More specifically, the transfer assist members disclosed herein can be selected for the Xerox Corporation iGEN® machines, inclusive of the iGenF®, that generate with some versions over 125 copies per minute. Processes of imaging, especially xerographic imaging and printing, including digital and/or color printing are thus encompassed by the present disclosure and where the disclosed transfer assist member (TAM), such as a member in the configuration of a blade, sweeps the backside of the image support substrate with a constant sufficient force at the entrance to the toner developed transfer region. In embodiments, the top wear resistant layer of the transfer assist member, such as the check film, contacts the backside of the image support substrate directly, and where the disclosed check film does not contact the image support layer.

Specific embodiments will now be described in detail. These examples are intended to be illustrative, and not limited to the materials, conditions, or process parameters set forth in these embodiments. All parts are percentages by solid weight unless otherwise indicated. The disclosed molecular weights, such as $M_w$ (weight average) and $M_n$ (number average), were provided by the entities disclosed herein and can, it is believed, be measured by a number of known methods, and more specifically, by Gel Permeation Chromatography (GPC).

Example I

There was prepared a transfer assist blade check film as follows:

There was initially prepared a crosslinked coating dispersion by mixing POLYFOX™ PF-7002 (a poly(oxetane) based fluorinated polyether diol available from OMNOVA Solutions) of the following formula/structure where the sum of x+y is from about 4 to about 5, and with a GPC determined weight average molecular weight of about 1,670±200, a F (fluoride) content of about 46 percent, and a hydroxyl number of about 67.2±8 milligrams KOH/g; CYMEL® 303 (a melamine formaldehyde resin available from Allnex Incorporated), and the catalyst p-toluenesulfonic acid at the weight ratio of about 30/70/0.2 in isopropanol (about 20 weight percent solids) via agitation to obtain a clear polymeric base solution.

Thereafter, there was added to the above obtained polymeric solution EMPEROR® E1200 (a carbon black available from Cabot Corporation) followed by ball milling with 2 millimeters stainless steel shots at 200 revolutions per minute, for 20 hours, followed by filtering the resulting coating dispersion (POLYFOX™ PF-7002/CYMEL® 303/ EMPEROR® E1200/p-toluene sulfonic acid with a weight ratio of 28.2/65.9/5.7/0.2 in isopropanol (about 20 weight percent solids), or in DOWANOL® PM (1-methoxy-2-propanol obtained from the Dow Chemical Company) through a 20 micron Nylon cloth filter to obtain the final crosslinked containing coating mixture where after thermal cure the crosslink amount was about 95 to about 99 percent as determined by Fourier Transform Infrared Spectroscopy (FTIR), and where the POLYFOX™ PF-7002/CYMEL® 303/EMPEROR®/E1200/p-toluene sulfonic acid weight ratio was 28.2/65.9/5.7/0.2.

The above prepared crosslinked coating mixture was then coated on 3 mil thick polyethylene terephthalate polymer (PET) film supporting substrate via either a lab draw bar coater or a production extrusion coater, and subsequently the resulting coating was cured at 140° C. for 5 minutes to obtain a flat, in appearance, check film comprising a 15 micron thick crosslinked overcoat layer of (POLYFOX™ PF-7002/CYMEL® 303/EMPEROR® E1200/p-toluene sulfonic acid) where the weight ratio was 28.2/65.9/5.7/0.2 present on the 3 mil thick PET.

The resistance of the above obtained crosslinked overcoat layer was measured to be about $4.8 \times 10^8$ ohm using a Trek Model 152-1 Resistance Meter, and this resistance was very uniform across the entire 2.5 inch×17 inch (the dimension of the real blade petal assembly) sample strip. The coating possessed a pencil hardness of 1H and was flexible, indicating excellent mechanical properties primarily because of the crosslinking.

In addition, the hexadecane contact angle, as measured with a Contact Angle System OCA, (Dataphysics Instruments GmbH, model OCA15) of the above obtained crosslinked coating of POLYFOX™ PF-7002/CYMEL® 303/ EMPEROR®/E1200/p-toluene sulfonic acid was about 65°±0° (noting that a pure PFTE film has a hexadecane contact angle of about 45°). From the hexadecane contact angle measurement, the data was very consistent across the surface with close to a zero (0) degree standard deviation, which was an indication of excellent compatibility between the two resin components of POLYFOX™ PF-7002 and the melamine formaldehyde resin CYMEL® 303.

Furthermore, the adhesion between the disclosed crosslinked containing mixture layer and the PET substrate was excellent, did not peel when subjected to adhesion testing by attempting to hand separate, a number of times, the substrate and the crosslinked layer mixture.

Also, the above prepared check film possessed excellent wear resistant characteristics and significant hand rubbing resistance where there were essentially no adverse xerographic developed image defects visually noticed subsequent to use in a xerographic process. More specifically, for a rub/wear test after 1 million rub/wear cycles in the xerographic machine iGenF® available from Xerox Corporation, the above prepared crosslinked check film illustrated substantially no visual wear areas, no visual wear spots, and improved rub resistance, about 35 percent better versus a known thermoplastic polyester/carbon check film.

Preparation of the Petal Assembly (Blade Material Comprising Five Layers) of the Transfer Assist Member The above prepared 3.6 mil check film and three separate 5 mil thick MYLAR® PET films were cut into 4 millimeter by 38 millimeter strips, and the strips were aligned in the sequence of MYLAR® PET film, MYLAR® PET film, and MYLAR® PET film with the disclosed check film/PET substrate facing a MYLAR® PET film. The aforementioned four layers were bonded together using 3M™ Double Coated Tape 444 in between from the edges of the long sides to about 2.5 millimeters inside. The partially bonded layers were then folded rendering the 2.5 millimeters wide bonded layers in a vertical position, and the 1.5 millimeters wide unbounded layers in a horizontal position.

The UHMW polyethylene, obtained from E.I. DuPont, believed to be of the following formula/structure wherein n represents the number of repeating segments of from about 150,000 to about 225,000 wear resistant layer 5pa was then bonded to the horizontal section of the above top MYLAR® PET film. The horizontal sections of the above layers were then cut into about 40 smaller segments with rectangular shapes.

Preparation of the Transfer Assist Member Assembly

The aluminum extruded aluminum component, such as element 1 of FIG. 1, was then attached to the above transfer assist member petal assembly, and then attached to the transfer assist member stainless steel clamp assembly by the transfer assist member aluminum rivet as illustrated herein.

Example II

Transfer assist blade members and petal assemblies are prepared in accordance with the process of Example I except there is selected in place of the POLYFOX™ PF-7002, a poly(oxetane) based fluorinated polyether diol of the following formula/structure, available from OMNOVA Solutions as POLYFOX™ PF-656 (x+y is equal to, or about 6), or POLYFOX™ PF-6520 (x+y is equal to, or about 20)

Example III

Two transfer assist blade members and petal assemblies are prepared in accordance with the process of Example I except there is selected in place of the POLYFOX™ PF-7002, a poly(oxetane) based fluorinated polyether diol of the following formula/structure, available from OMNOVA Solutions as POLYFOX™ PF-636 (x+y is equal to, or is about 6), and POLYFOX™ PF-6320 (x+y is equal to, or is about 20)

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A transfer assist member comprising a plurality of layers, one of said layers being a check film layer comprising a mixture of an aminoplast resin and a hydroxyl terminated poly(oxetane) based fluorinated polyether.

2. A transfer assist member in accordance with claim 1 wherein there is generated a crosslinked component by reacting said hydroxyl terminated poly(oxetane) based fluorinated polyether with said aminoplast resin.

3. A transfer assist member in accordance with claim 2 further including in said crosslinked component, a conductive component, and wherein said hydroxyl terminated poly(oxetane) based fluorinated polyether is represented by at least one of the following formulas/structures and wherein each x and y are from 1 to about 40, and including a supporting substrate, an optional wear resistant layer.

4. A transfer assist member in accordance with claim 3 wherein said aminoplast resin is a melamine formaldehyde resin or a methylated/butylated melamine formaldehyde resin, and wherein said wear resistant layer is present and is comprised of a polyethylene as represented by the following formula/structure wherein n represents the number of repeating segments of from about 100,000 to about 300,000.

5. A transfer assist member in accordance with claim 3 wherein x is from about 2 to about 20 and y is from about 2 to about 20 and wherein said aminoplast resin is a melamine formaldehyde resin.

6. A transfer assist member in accordance with claim 3 wherein said hydroxyl terminated poly(oxetane) based fluorinated polyether is represented by the following formula/structure wherein the sum of x and y is from about 6 to about 20.

7. A transfer assist member in accordance with claim 3 where the fluoride content of said hydroxyl terminated poly(oxetane) based fluorinated polyether is from about 10 to about 70 weight percent.

8. A transfer assist member in accordance with claim 3 wherein the crosslinked percentage is from about 50 to about 99 percent.

9. A transfer assist member in accordance with claim 3 wherein said conductive component is selected from the group consisting of at least one of carbon black, a metal oxide of tin oxide, antimony doped tin oxide, indium oxide, indium tin oxide, zinc oxide, and titanium oxide, and wherein said wear resistant layer is present as a top layer of said plurality of layers.

10. A transfer assist member in accordance with claim 3 wherein said supporting layer is present, and where the crosslinked component in the configuration of a layer is deposited on said supporting substrate selected from the group consisting of polycarbonates, polyesters, polysulfones, polyamides, polyimides, polyamideimides, polyetherimides, polyolefins, polystyrenes, polyvinyl halides, polyvinylidene halides, polyphenyl sulfides, polyphenyl oxides, polyaryl ethers, polyether ether ketones, polyethylene terephthalate polymers (PET), polyethylene naphthalates, and mixtures thereof, wherein said wear resistant layer is present as a top layer of said plurality of layers.

11. A transfer assist member in accordance with claim 3 wherein the hydroxyl terminated poly(oxetane) based fluorinated polyether component is present in an amount of from about 5 to about 70 weight percent, the aminoplast resin present in an amount of from 10 to 90 weight percent, wherein the conductive component is present in an amount of from 3 to 60 weight percent, each based on the solids, and wherein the aminoplast resin is a melamine formaldehyde resin.

12. A transfer assist member in accordance with claim 1 wherein said plurality of layers are comprised of three polyester layers situated between and in contact with said check film, and a wear resistant layer comprised of a polyethylene as represented by the following formula/structure wherein n represents the number of repeating segments of from about 100,000 to about 300,000.

13. A transfer assist member in accordance with claim 1 wherein said plurality of layers is comprised of at least three separate polymer layers of a bottom layer, a middle layer and a top layer, and which bottom layer is in contact with said check film present on a polymer layer comprised of a polyethylene terephthalate or a polyethylene naphthalate, and wherein each of said layers are bonded with an adhesive layer.

14. A transfer assist member comprising a supporting substrate layer, at least one adhesive layer, and a layer check film comprising a mixture of a conductive component, an acid catalyst, and a hydroxyl terminated poly(oxetane) based fluorinated polyether as represented by at least one of the following formulas/structures wherein each x and y represent the number of segments, and wherein said hydroxyl terminated poly(oxetane) based fluorinated polyether is crosslinked with an aminoplast resin, and a wear resistant layer in contact with said crosslinked hydroxyl terminated poly(oxetane) based fluorinated polyether layer, and which member is substantially free of bioaccumulation characteristics.

15. A transfer assist member in accordance with claim 14 wherein x is from about 1 to about 40 and y is from about 1 to about 40; said crosslinked percentage is from about 50 percent to about 99 percent as determined by Fourier Transform Infrared Spectroscopy (FTIR); wherein the fluoride content of the hydroxyl terminated poly(oxetane) based fluorinated polyether is from about 10 to about 70 weight percent; wherein said aminoplast resin is a melamine formaldehyde resin; wherein said conductive component is carbon black, and optionally further wherein said conductive component of carbon black is included in the supporting substrate layer.

16. A transfer assist member in accordance with claim 14 wherein said hydroxyl terminated poly(oxetane) based fluorinated polyether is represented by the following formula/structure and wherein said aminoplast resin is a melamine formaldehyde resin.

17. A transfer assist member in accordance with claim 14 wherein said crosslinked hydroxyl terminated poly(oxetane) based fluorinated polyether layer is in contact with said supporting substrate, and further includes a second resin, silica, polytetrafluoroethylene, a plasticizer, a leveling agent, or mixtures thereof, and wherein said conductive component is carbon black.

18. A transfer assist member in accordance with claim 17 wherein said supporting substrate is a polymer comprised of a polyethylene terephthalate or a polyethylene naphthalate.

19. A check film consisting essentially of a hydroxyl terminated poly(oxetane) based fluorinated polyether, a conductive component, and an optional catalyst, wherein said hydroxyl terminated poly(oxetane) based fluorinated polyether is represented by at least one of the following formulas/structures -continued wherein each x and y represent the number of segments with x being from about 1 to about 40 and y being from about 1 to about 40; wherein said hydroxyl terminated poly(oxetane) based fluorinated polyether is crosslinked with an aminoplast resin.

20. A check film in accordance with claim 19 further including a wear resistant layer comprised of a polyethylene as represented by the following formula/structure wherein n represents the number of repeating segments of from about 100,000 to about 300,000.

21. A check film in accordance with claim 19 that possesses a resistivity of from about $1\times10^7$ to about $1\times10^{10}$ ohm, which resistivity is measured with Trek Model 152-1 Resistance Meter, wherein x is from about 5 to about 12, and y is from about 5 to about 10, and wherein the weight average molecular weight of said hydroxyl terminated poly (oxetane) based fluorinated polyether as determined by GPC analysis is from about 500 to about 8,000, and the hydroxyl number of said hydroxyl terminated poly(oxetane) based fluorinated polyether as determined by gravimetric analysis is from about 20 to about 200 milligrams KOH/gram, which check film has a crosslinking value of from about 50 to about 99 percent.

* * * * *